Nov. 26, 1957     I. SHUR     2,814,324
QUICK-ACTING NUT HAVING THREAD SEGMENTS
LEVER ACTUATED BY ENTRANCE OF BOLT
Filed June 5, 1953     3 Sheets-Sheet 1

INVENTOR
IRA SHUR,

BY

ATTORNEY

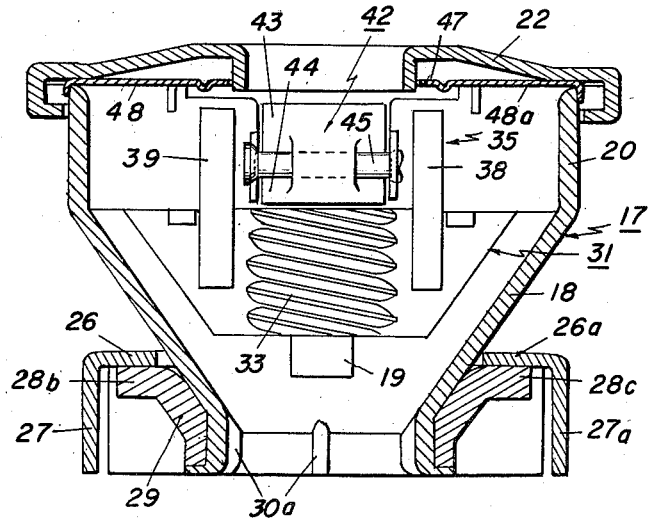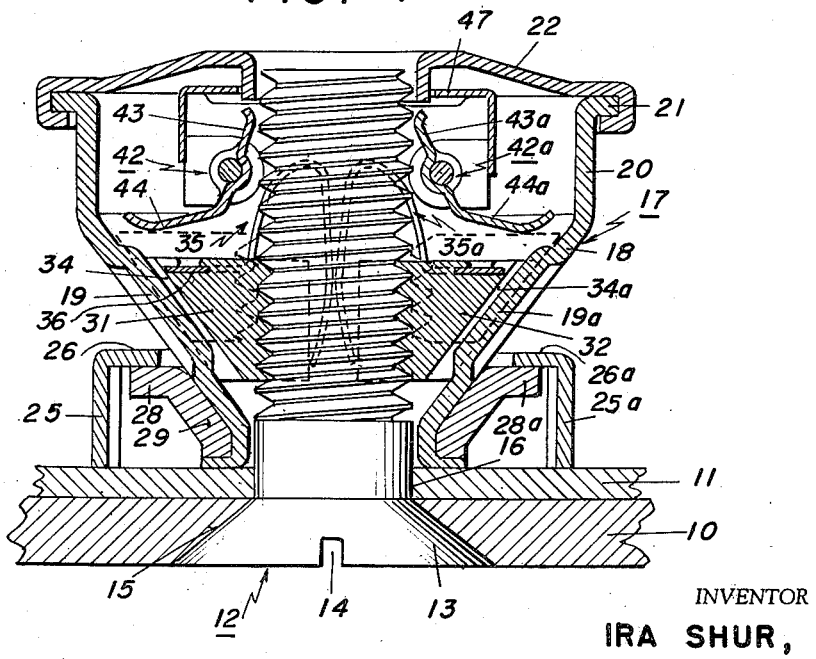

Nov. 26, 1957              I. SHUR              2,814,324
QUICK-ACTING NUT HAVING THREAD SEGMENTS
LEVER ACTUATED BY ENTRANCE OF BOLT
Filed June 5, 1953                               3 Sheets-Sheet 3
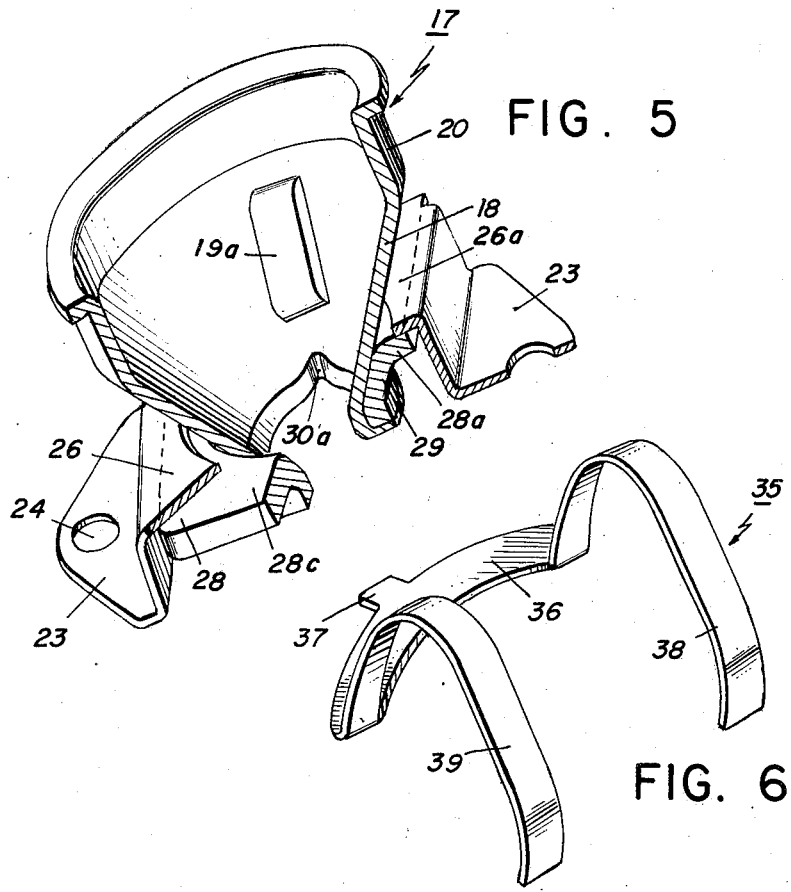
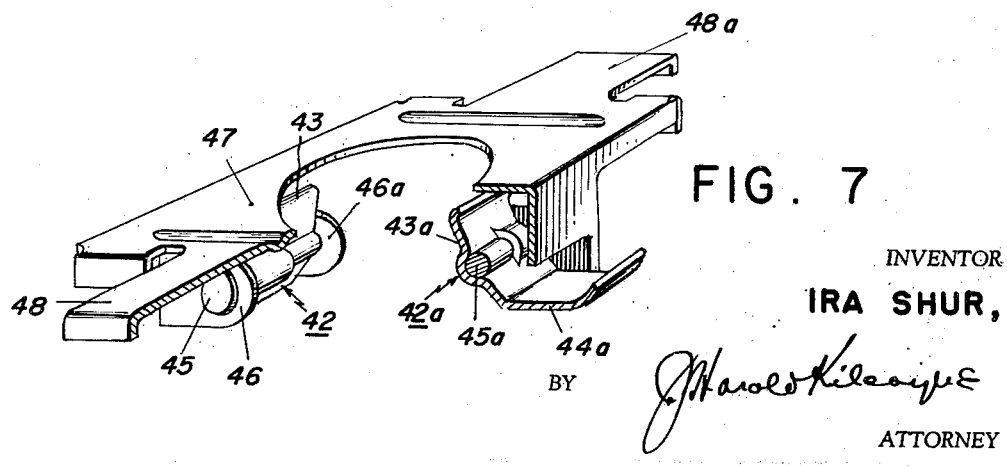
INVENTOR
IRA SHUR,
BY
ATTORNEY United States Patent Office 2,814,324
Patented Nov. 26, 1957

2,814,324

QUICK-ACTING NUT HAVING THREAD SEGMENTS LEVER ACTUATED BY ENTRANCE OF BOLT

Ira Shur, Bayside, N. Y., assignor to Waldes Kohinoor, Inc., Long Island City, N. Y., a corporation of New York Application June 5, 1953, Serial No. 359,819

6 Claims. (Cl. 151—19)

This invention relates to improvements in quick-acting fasteners, and more particularly to an improved bolt and nut fastener of a type enabling full fastening and unfastening effect to be attained with only limited turning of the bolt in proper direction and in which the bolt may be fully fastened and unfastened from the bolt side of the fastener.

Although not restricted thereto, an important application of a quick-acting fastener of the type herein contemplated is to secure doors and panels in cut-outs providing access openings in aeroplanes, i. e. fuselage, partitions, wings, etc., since speed in fastening the door or panel to and unfastening it from the plane cut-out is highly essential in such an application, and can be attained only through the use of a quick-acting fastener. In an effort to provide such a fastener, it has been suggested previously, reference being had to United States Patent No. 2,576,579, dated November 27, 1951, to form the nut of a bolt and nut assembly as a sub-assembly comprising a tapered shell or housing containing a plurality of correspondingly tapered nut segments which are normally maintained in spread-apart relation in the larger diameter end of the shell by spring means acting thereon in axial direction, but are forced into the smaller diameter end of the shell wherein they function as a conventional nut by means of spring fingers which are activated upon simple axial insertion of the bolt into the shell. However, the prior quick-acting fastener characterized as above has proved cumbersome and unreliable and furthermore lacks the degree of positiveness in its fastening and unfastening action required for a fastener designed for the exacting service aforesaid.

Accordingly, it is a principal object of the invention to improve the prior bolt and nut assemblies designed to provide a quick-acting fastener in respect to reduction in the number of parts thereof and in such manner that the fastener performs in simple yet effective and thoroughly dependable fashion.

More particularly, it is an object of this invention to provide, in a quick-acting bolt and nut type fastener of the character specified, an improved spring means for normally maintaining the nut segments in the larger diameter end of the nut shell or housing and which also functions positively to return the segments to such end following each unfastening operation.

A further object of the invention is the provision, in a quick-acting bolt and nut assembly of the character specified, of spring means for spreading the bolt segments into the larger diameter end of the nut shell or housing, which is so constructed and arranged so that it operates in diameter rather than in axial direction with respect to the nut segments, and also so that it exerts symmetrical, opposite pressure on said nut segments.

Another object of the invention is the provision, in a quick-acting bolt and nut assembly of the character specified, of improved means for positively actuating the nut segments into the smaller diameter end of the nut shell of housing responsively to axial insertion of the bolt into said shell.

Yet a further object of the invention is the provision of a quick-acting bolt and nut assembly of the type employing a conventional bolt and a nut comprising a sub-assembly of a tapered shell or housing containing two correspondingly tapered half-round nut sections, in conjunction with improved spring means acting diameter-wise and in symmetrically opposite direction on said sections normally to maintain them in the larger diameter end of the shell and to return them to said end in automatic manner following each withdrawal of the nut, together with improved lever means actuable by the bolt upon insertion into the nut for positively actuating the nut segments into the smaller diameter end of the shell to a position in which said segments together function as a conventional nut having internal threads cooperating with the external threads of the inserted bolt.

Still another object of the invention is the provision, in a quick-acting bolt and nut assembly of the type specified, of novel lever means actuable by the bolt upon insertion thereof into the nut positively to actuate the nut segments into the smaller diameter end of the nut shell to a position in which their internal threads engage with the external threads of the bolt and the segment to function as a conventional nut in which the bolt may be turned, thus to provide the desirable quick fastening action.

Yet another object of the invention is the provision, in a quick-acting bolt and nut assembly as characterized in the foregoing, of spring means acting normally to expand the nut segments and lever means acting responsively to bolt insertion to contract the nut segments, and which function conjointly to automatically expel the bolt from the nut upon partial release of the nut holding pressure as results upon the bolt being initially backed off from the nut as by a screw driver.

A still further object of the invention is the provision of a quick-acting nut and bolt assembly of the type specified, which enables the use of bolts of greater than standard length, and thus is not limited to the use of a fixed or standard length of bolt as was the case of the prior bolt-nut assemblies serving similar function.

The above and other objects and features of advantage of a quick-acting bolt and nut-type fastener according to the invention will appear from the following detailed description thereof, taken with the accompanying drawings, in which:

Fig. 2 is a vertical section taken through the nut along line 2—2 of Fig. 1;

Figure 1:
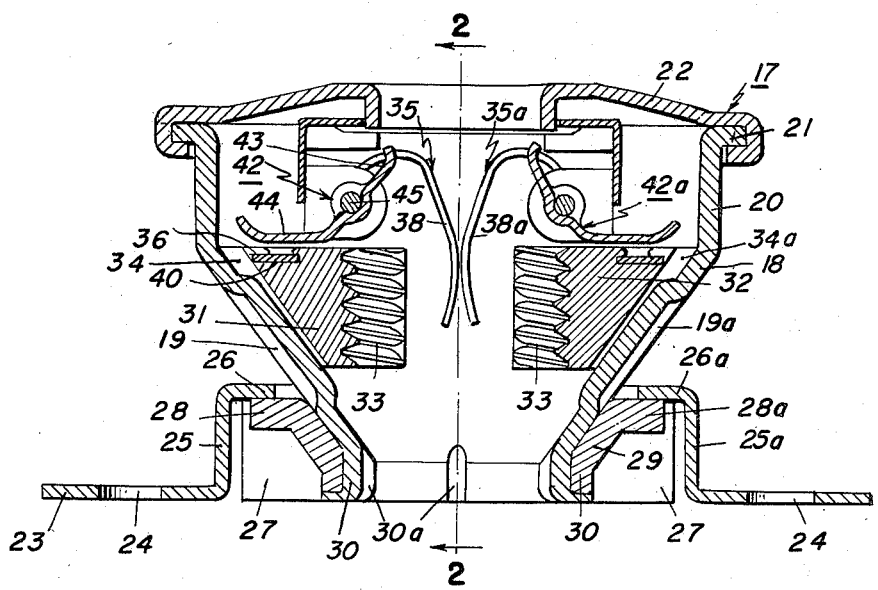
Fig. 1 is an enlarged vertical section taken through the improved nut prior to the insertion of the bolt.

Fig. 4 is a view similar to Fig. 1 but illustrating the bolt inserted and fully fastened to the nut; and Figs. 5, 6 and 7 are, respectively, part-sectional and/or perspective views of the nut shell and its mounting means, of one of the improved springs of the invention employed to spread the nut segments, and of the lever mechanisms for actuating the nut segments into the smaller diameter end of the shell.

Referring to the drawings, a quick-acting bolt and nut assembly according to the invention is adapted to fasten together and unfasten the two plates 10 and 11 only partially shown in Fig. 4, of which the plate 10 may represent a door or panel, and the plate 11 the skin of an aeroplane wing defining a cut-out or access opening to the wing interior (or the frame of such a cut-out or access opening) which is adapted to be closed and opened by said door or panel. The bolt component of such a fastening means is shown to comprise a conventional bolt 12 having a tapered head 13 provided with the usual slot 14 for a screw driver, the head seating in a countersunk opening 15 of the plate 10, which is aligned with the opening 16 in the plate 11 providing for passage of the bolt therethrough.

An improved nut 17 according to the invention is affixed to the rear or under face of the plate 11 as by means to be described, and comprises a sub-assembly of parts housed within a sheet-metal shell of appreciable axial dimension having a tapered portion 18 formed with internal, axially extending ribs 19, 19a, and a cylindrical portion 20 extending axially from the large diameter end of said tapered portion, and serving to accommodate parts later to be described. The open end of the cylindrical shell portion 20 is provided with a radial flange 21 to which a dust cap 22 is attached, the latter having a central opening to accommodate the shank end of the bolt upon insertion thereof into the nut, as seen in Fig. 4.

Figure 3:
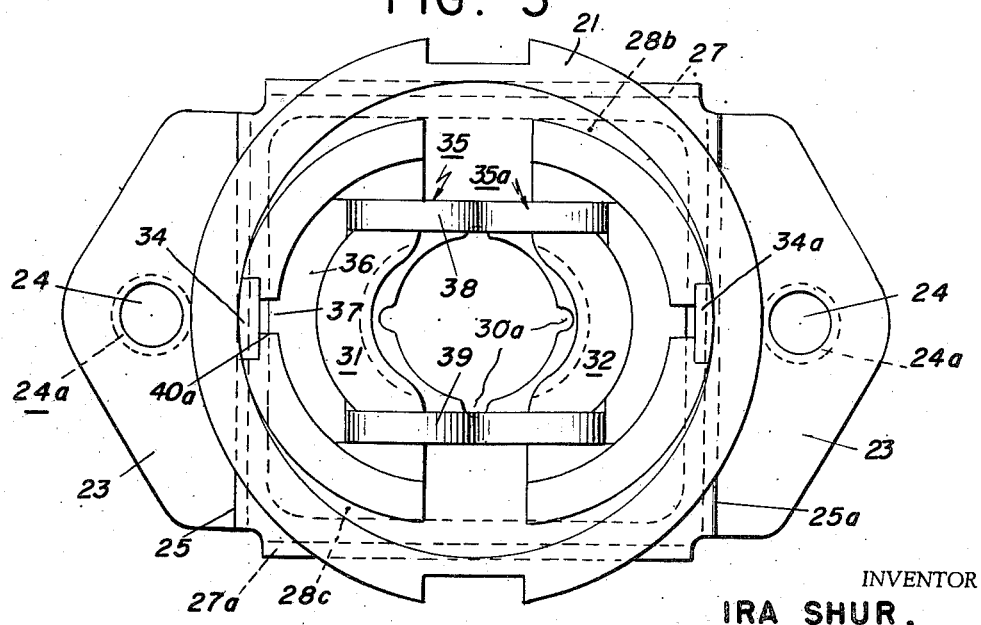
Fig. 3 is a plan view of the nut shown in Fig. 1 which omits the lever mechanisms for actuating the nut segments into the smaller diameter end of the nut shell.

The nut shell 18, 20 incorporates means for permanently affixing same to the inner face of the plate 11 so that it forms a rigid part thereon. Such means, as best seen in Figs. 1, 3 and 5, illustratively comprises a generally rectangular mounting plate 23 provided in its flat end portion with holes 24 to receive rivets 24a for securing same flush against the inner face of the plate 11. Said mounting plate 23 is formed adjacent its ends with transversely disposed vertical wall portions 25, 25a from which extend inward hold-down flanges 26, 26a, and along its sides with side flanges 27, 27a. Rather than attaching directly to the small diameter end of the tapered shell portion 18, the flanges 26, 26a extend over the opposed end flanges 28, 28a of a rectangularly flanged reinforcing ring 29 which is directly affixed to said small diameter end, being tapered in its body portion to correspond to shell taper. At its lower end, the ring is formed cylindric and is provided with a plurality of axial indentations 30 in which are pressed mating ribs or projections 30a provided in the extreme small diameter end of the tapered shell portion 18 which, it will be observed, is also formed cylindric. Thus, the nut shell 18, 20 is secured to and against rotation with respect to the reinforcing ring 29, and said ring is similarly secured against rotation with respect to the mounting plate 23 by means of engagement of its aforesaid end flanges 28, 28a and its opposed side flanges 28b, 28c with the vertical wall portions 25, 25a and side flanges 27, 27a of the mounting plate. It will be observed, however, that the reinforcing ring 29, and hence nut shell 18, 20, has slight play with respect to the mounting plate 23, thus to facilitate axial alignment of the nut bore with the hole 16 in the plate 11, and thereby axial insertion of the bolt 12 into the nut assembly.

Contained within the nut shell 18, 20 are two half-round nut segments 31, 32 provided with internal threads 33, the half threads complementing one another upon the nut segments being brought together in the small diameter end of the tapered shell portion 18. The outer peripheries of the nut segments have taper corresponding with that of the shell portion 18, and in such peripheries they are provided with axial recesses 34, 34a, in which seat the aforesaid shell ribs 19, 19a. Accordingly, the two nut segments are held against rotation with respect to the shell, while at the same time they may move axially within the tapered portion 18 thereof.

It will be understood that in a bolt and nut assembly of the type under consideration the nut segments 31, 32 are normally maintained in the larger diameter end of the tapered shell portion 18, in which position their threads 33 are spread apart a distance substantially greater than the outer diameter of the bolt threads. It is also a requirement of such a quick-acting bolt and nut assembly that the nut segments be actuated into the smaller diameter end of the tapered shell portion 18 upon insertion of the bolt into the nut, and that when so actuated, the nut segments come together and form a complete nut whose internal threads 33 have mating engagement with the bolt threads.

To provide for the nut segments being normally maintained in the larger diameter end of the tapered shell portion 18, as aforesaid, the invention provides novel spring means which act on the nut segments to apply symmetrical, opposite pressure thereon in the direction of their diameters. Referring to Figs. 1 and 4, such improved spring means illustratively comprise a pair of spring members 35, 35a, one for each nut segment, and which are oppositely disposed and related so as to be reactive against one another, as will be explained. Since both springs have identical construction, only one thereof will be described, namely, the spring 35 associated with the nut segment 31. As seen in Fig. 6, said spring 35 is provided with an arcuate base or attaching portion 36 formed in its mid portion with an outwardly radial tongue or key 37. Integral with the attaching portion 36 and projecting from the ends thereof are two spaced and generally parallel spring leafs 38, 39 which, by reference to Fig. 6, have generally inverted U-form. As best seen in Fig. 3, the spring leafs 38, 39 are spaced apart a distance greater than the diameter of the nut bore, so that they do not interfere in any way with the movement of the bolt 12 into or out of the nut.

Preferably, securement of the spring 35 to its associated nut segment is effected by seating its arcuate attaching portion 36 in a correspondingly shaped groove 40 provided in the upper face of the nut segment, followed by peening over the side walls of the groove so as to rigidly affix the attaching portion to the nut segment. The projecting tongue 37 meanwhile seats in a closely fitting recess 40a also provided in the upper face of the nut segment so as to connect with the aforesaid groove 40, such arrangement insuring against the spring 35 turning with respect to the nut segment.

The spring leafs 38, 39 project inwardly from the arcuate attaching portion 36 of the spring a distance such that their downwardly inclined free ends bear with spring pressure against the corresponding free ends of the companion, oppositely disposed spring 35a affixed in the identical manner to the nut segment 32, as is indicated in Figs. 1 and 2. Thus, the springs always exert spreading pressure on the nut segments in diameter direction, as well as symmetrically with respect to the common center line extending through the segments. By virtue of the taper of the outer periphery of the nuts and the corresponding taper of the tapered portion 18 of the shell, such spreading pressure imposed on the nut segments causes them normally to be maintained in the larger diameter end of said shell portion. It will also be seen that as the springs are compressed consequent to movement of the nut segments into the smaller diameter end of the tapered shell portion 18, they impose an even greater force on said nut segments, causing them positively to retract into said larger diameter portion of the shell when they are free to do so, for example, upon withdrawal of the bolt from the nut assembly.

To provide for positive movement of the nut segments 31, 32 axially towards the smaller diameter end of the tapered shell portion 18 in response to axial insertion of the bolt into the nut assembly as aforesaid, the invention provides a pair of lever assemblies generally designated 42 and 42a which are contained in the cylindrical portion 20 of the nut shell. Since both lever assemblies are of identical construction, although oppositely arranged with respect to one another, only one such assembly will be described. Referring to Figs. 1 and 7, and describing the left-hand lever assembly 42 operating on the nut segment 31, such comprises a bellcrank lever having arms 43, 44, and being journaled for angular (rocking) motion on a pivot pin 45. Said pivot pin is supported in ears 46, 46a, depending from a flexible plate 47 which bridges the flange 21 of the cylindrical portion 20 of the nut shell, the plate being supported from the flange as by means of side arms 48, 48a extending from said plate and which engage over said flange. Preferably, the flexible plate 47 is secured fast to the flange by the dust cap 22. Thus, it will be seen that the lever assembly 42 (and also its companion but oppositely arranged lever assembly 42a) are enclosed within the nut shell in operative relation to the nut segments 31, 32, also contained therein.

As best seen in Fig. 1, the lever arms 43, 44 of the lever mechanisms are angularly related by an amount such that normally the arm 43 inclines into the nut opening or bore, and the arm 44 bears flat against the large diameter end face of the nut segment 31. Thus, as seen in Fig. 1, taken with Fig. 4, the lever arms 43 of the companion lever mechanism are positioned so as to be engaged by the bolt 12 upon the latter being pressed axially into the nut and thereupon rocked in direction as to cause their associated lever arms 44 to bear against the nut segments 31, 32 and positively force them axially towards the small diameter end of the tapered shell portion 18, against the bias of springs 35, 35a which oppose such movement. By design, such axial movement of the nut segments is such as to move them to their dotted line position illustrated in Fig. 4, in which their internal threads have working engagement with the external threads of the bolt 12. When now the bolt is turned by a screw driver, the nut segments move further into the extreme small diameter end of the tapered shell portion 18 wherein they function as a conventional nut and thereby provide a tight fastening of the bolt nut-assembly as a whole. The described arrangement is such that in actual practice but a few turns of the bolt suffices to achieve full fastening effect and, in the case of the pitch of bolt and nut threads being exceedingly coarse, such full fastening may be achieved with but a partial turning of the bolt.

To unfasten the bolt 12 from the nut, it is only necessary to back off the bolt by turning it a few turns (or even a partial turn in the case of a coarse thread) in the proper direction, as required for the end of the bolt to clear the arms 43 of the lever assemblies 42, 42a. When such occurs, the threads of the nut segments are effectively disengaged from the bolt threads, enabling the bolt to be withdrawn freely. Since the nut segments 31, 32 are now free to return to their fully spread position under the force exerted thereon by the springs 35, 35a, they do so and the nut is conditioned for another insertion of the bolt. The aforesaid withdrawal of the bolt is assisted by the conjoint action of the springs 35, 35a and the lever assemblies 42, 42a, resulting in the lever arms 43, 43a imposing an axial thrust on the end of the bolt tending automatically to expel same from the nut upon the bolt being given a few backing-off turns.

Without further analysis, it will be appreciated that a nut and bolt assembly as illustrated and described herein achieves the desirable objectives of a quick-acting fastener set forth in the foregoing. Such is due in part to the unique construction of the springs 35, 35a and to the manner in which they exert balanced pressure on the nut segments 31, 32, both when the segments are spread and during their axial movement in the shell 18, 20. The positive action of the lever assemblies 42, 42a in actuating the nut segments into the smaller diameter end of the shell is notable in that when the companion double-arm or bellcrank levers thereof are actuated in proper direction, as they must be, by pressing the bolt into the nut, they impose a positive thrust on the nut segments which causes them to move as intended, and they are also so constructed and arranged that they impose no restriction or interference against the springs 35, 35a operating in their intended manner to spread the nut segments. The feature of the present nut assembly in employing only two nut segments is of advantage since nuts consisting of only two segments are easier to manufacture and assemble than are split nuts consisting of three or more such segments. While the nut shell is manufactured from sheet metal, it will be noted that it is adequately reinforced in its portion which is required to withstand the fastening stresses, as well as the stresses incident to its securement to one of the plates to be secured. The mounting of the lever assemblies 42, 42a from the flexible plate 47 represents another feature of practical advantage characterizing the present nut assembly, since the plate may give the limited amount required to insure easy insertion of the bolt into the nut, thus insuring against the lever assemblies binding or cramping when engaged by the bolt and when operating on the nut segments 31, 32 as aforesaid.

The flexibility of the plate 47 is also important because thereby the assembly is not limited to the use of standard-size bolts but permits the use of over-size (longer than standard) bolts. This may be explained as follows: Assuming the plate 47 to be non-flexible, when an over-size bolt is pushed into the nut to a position in which its end threads have engaged the lever arms 43, 43a and rocked them outwardly to the limit of their swinging movement, the whole system becomes rigid so that further insertion of the bolt is prevented. But since plate 47 is flexible, when so engaged both nut segments and levers can move somewhat upwardly (Fig. 4) and accordingly the nut segments can move radially outwardly enough so that their internal threads clear the threads of the bolt with which they have previously engaged. In this way, the bolt can move up one thread at a time, during which movement the nut segments engage the next lower threads, with the threads of the nut segments "ratcheting" over the bolt threads until the bolt has been finally seated. This "ratcheting" produces a clicking sound (also present to a lesser degree when bolts of standard length are employed) which is desirable in acquainting the operator of the fact that the threads of nut segments and bolt have interengaged.

As many changes could be made in carrying out the above constructions without departing from the scope of the invention, it is intended that all matter contained in the above description or shown in the accompanying drawings shall be interpreted as illustrative and not in a limiting sense.

I claim:

1. In a quick-acting bolt and nut fastener, a nut assembly comprising a tapered shell having an axial opening for receiving a bolt, two oppositely arranged nut segments functioning when brought together as a nut, said segments being contained within the shell and having peripheries which are tapered corresponding to the taper of the shell whereby said segments move toward and away from one another when actuated axially within the shell, means for preventing rotation of the segments while permitting their axial movement within the shell, spring means normally urging the segments to spread-apart position in the larger diameter end of the shell, said spring means comprising companion, oppositely disposed springs each affixed to a nut segment and including two spring leaves of generally inverted U-form which are disposed symmetrically to the sides of the bolt opening and are spaced from one another a distance greater than the diameter of the bolt opening, the free ends of the leaves of one spring extending toward the other segment and reacting against the oppositely disposed leaves of the companion spring, whereby said spring leaves exert opposite pressure in diameter direction on said nut segments thereby normally maintaining the segments spread apart in the larger diameter of the shell, and means responsive for its operation to the axial insertion of a bolt into the smaller diameter end of the shell for actuating the segments into said smaller diameter end, thereby to bring them together and into threaded engagement with the bolt.

2. In a quick-acting bolt and nut fastener, a nut assembly substantially as set forth in claim 1, wherein said spring members each includes an attaching portion extending intermediate its spring leaves and which is affixed to the larger diameter end face of its associated segment.

3. In a quick-acting bolt and nut fastener, a nut assembly substantially as set forth in claim 1, wherein said spring members each includes an attaching portion extending intermediate its spring leaves and which is secured in a groove provided therefor in the larger diameter end of its associated segment.

4. In a quick-acting bolt and nut fastener, a nut assembly comprising a tapered shell having an axial opening for receiving a bolt, two oppositely arranged nut segments functioning when brought together as a nut, said segments being contained within the shell and having peripheries which are tapered corresponding to the taper of the shell whereby said segments move toward and away from one another when actuated axially within the shell, means for preventing rotation of the segments while permitting their axial movement within the shell, spring means normally urging the segments to spread-apart position in the larger diameter end of the shell, said spring means comprising companion, oppositely disposed springs each affixed to a nut segment and extending towards the other segment and reacting against its companion opposite spring, whereby said springs exert opposite pressure in diameter direction on said nut segments, thereby normally maintaining the segments spread apart in the larger diameter end of the shell, and means responsive for its operation to the axial insertion of a bolt into the smaller diameter end of the shell for actuating the segments into said smaller diameter end, thereby to bring them together and into threaded engagement with the bolt, said last means comprising a pair of oppositely disposed lever mechanisms contained in the larger diameter end of the shell, one lever mechanism for each segment and each comprising a bellcrank lever and means mounting said lever for pivotal movement about an axis extending transversely of the bolt opening and which is so located that one arm of said lever normally extends into the bolt opening so as to be engaged and rocked by the bolt upon insertion thereinto and the other arm bears on the larger diameter end of its segment thereby when the lever is rocked to actuate the segment axially into the smaller diameter end of the shell.

5. In a quick-acting bolt and nut fastener, a nut assembly substantially as set forth in claim 4, wherein said lever mechanisms are contained within a cylindrical shell portion extending from the larger end of the shell and are supported therein from a flexible member extending across said cylindrical portion.

6. In a quick-acting bolt and nut fastener, a nut assembly substantially as set forth in claim 4, wherein the means mounting said bellcrank levers include pins having bearing in spaced brackets depending from a flexible member extending across the larger diameter end of the shell.

References Cited in the file of this patent
UNITED STATES PATENTS

| | | |
|---|---|---|
| 2,489,613 | Beswick | Mar. 29, 1949 |
| 2,576,579 | Donovan | Nov. 27, 1951 |